United States Patent [19]
Enta

[11] Patent Number: 5,983,197
[45] Date of Patent: Nov. 9, 1999

[54] MONITORING METHOD AND MONITORING SYSTEM FOR AUTOMATIC TRANSACTION MACHINE

[75] Inventor: Masayuki Enta, Tokyo, Japan

[73] Assignee: Oki Electric Industry Co., Ltd., Tokyo, Japan

[21] Appl. No.: 08/929,764

[22] Filed: Sep. 15, 1997

[30] Foreign Application Priority Data

Mar. 12, 1997 [JP] Japan .................................. 9-076583

[51] Int. Cl.$^6$ .................................................. G06F 17/60
[52] U.S. Cl. .................................. 705/16; 705/7; 902/38; 364/479.14; 235/379
[58] Field of Search .............................. 902/38, 39, 40; 364/476.06, 479.07, 479.11, 479.14; 702/188; 235/379, 380, 381; 705/7, 9

[56] References Cited

U.S. PATENT DOCUMENTS 5,010,238  4/1991  Kadano et al. ......................... 235/379
5,091,713  2/1992  Horne et al. ........................ 364/479.06

Primary Examiner—Robert A. Weinhardt
Assistant Examiner—Mussie K. Tesfamariam
Attorney, Agent, or Firm—Venable; Robert J. Frank; Norman N. Kunitz

[57] ABSTRACT

Failure information and cash reserve information for each automatic transaction machine 5 are collected at a monitoring center 5. In a dispatch condition table, criteria for making decisions such as a dispatch standby being required when a specific number of automatic transaction machines are not operating at a given point in time are displayed. A dispatch decision making portion references the dispatch condition table to display the necessity for a dispatch, the necessity for a dispatch standby and the like on the display. Since the decision making criteria in regard to whether or not a service person should be placed on standby for dispatch or whether or not a request for dispatch should be issued are clearly defined in correspondence to the number of operating machines and the state of the cash reserve, suitable measures can be taken in correspondence to the state of each automatic transaction machine, thereby reducing the responsibility of the operator at the monitoring center.

14 Claims, 6 Drawing Sheets

| on-duty time point | threshold value for dispatch | threshold value for dispatch standby |
|---|---|---|
| 9.00 | 2 | 3 |
| 10.00 | 2 | 3 |
| 18.00 | 1 | 2 |

| on-duty time point | threshold value for dispatch | threshold value for dispatch standby |
|---|---|---|
| 9.00 | ¥000 | ¥000 |
| 10.00 | ¥000 | ¥000 |
| ⁓ | ⁓ | ⁓ |
| 19.00 | ¥000 | ¥000 |

FIG. 6

MONITORING METHOD AND MONITORING SYSTEM FOR AUTOMATIC TRANSACTION MACHINE

BACKGROUND OF THE INVENTION

The present invention relates to a monitoring method and a monitoring system for automatic transaction machines that are widely used by financial and similar institutions.

Automatic transaction machines are widely employed at financial institutions to reduce work load at the teller stations. The customer can access the financial transaction management center via an automatic transaction machine to execute financial transactions such as deposits, withdrawals, transfers and other similar transaction.

Each financial institution installs several of such automatic transaction machines in each manned or unmanned branch. In order to achieve a smooth utilization of these automatic transaction machines, it is necessary to store an appropriate amount of cash and the like required for transactions inside each machine.

In particular, in an unmanned branch or in a manned branch when the machines must operate outside of business hours, or on weekends and holidays, the management of the cash provided in each machine is vital. For instance, Japanese Unexamined Patent Publication No. 8-101947 discloses a method for providing only the minimum required fund in each automatic transaction machine by projecting how much will be needed at each automatic transaction machine based upon past data.

Now, the prior art as described above presents the following problems yet to be addressed.

Operating automatic transaction machines are carefully monitored by special operators working at a monitoring center which is normally located some distance from the machines. If a failure occurs in several of the plurality of automatic transaction machines, halting their operation may be necessary. If the cash reserve in operating machines becomes reduced to the point where it requires replenishment, the operator at the monitoring center decides to dispatch a service person as necessary.

However, it is not easy to make a correct judgment in regard to such a dispatch, and therefore, it places a great deal of responsibility on the operator. In addition, if the amount of cash stored in each machine is very large so as to reduce the frequency of such service calls, efficient utilization of the fund is prevented. Thus, both storing the appropriate amount of cash reserve in the machines and performing efficient service dispatch management at the monitoring center are essential matters to be addressed.

SUMMARY OF THE INVENTION

The monitoring method for automatic transaction machines in a first aspect of the present invention which has been achieved to address the problems discussed above in regard to monitoring systems for automatic transaction machines in the prior art, comprises a step in which the operations of a plurality of automatic transaction machines are monitored to acquire failure information from these automatic transaction machines on the presence/absence of failures and a step in which a decision is made as to whether or not it is necessary to dispatch a service person based upon criteria that have been prepared in advance and indicate the relationship between the number of operating machines and the necessity for the dispatch of a service person and the results of this decision making are then displayed.

In addition, the monitoring method for automatic transaction machines in a second aspect of the present invention comprises a step in which the operations of a plurality of automatic transaction machines are monitored to acquire cash reserve information from these automatic transaction machines on the amount of cash on hand in the machines and a step in which a decision is made as to whether or not it is necessary to dispatch a service person based upon criteria that have been prepared in advance to indicate the relationship between the total cash reserve in operating automatic transaction machines at a given branch and the necessity for the dispatch of a service person and the results of the decision making are displayed.

Furthermore, the monitoring system for automatic transaction machines in a third aspect of the present invention is provided with a monitoring center that monitors the operations of a plurality of automatic transaction machines and acquires failure information from the automatic transaction machines on the presence/absence of failures to make a decision as to whether or not it is necessary to dispatch a service person, with the monitoring center comprising a dispatch condition table that indicates the relationship between the number of operating machines and the necessity for the dispatch of a service person and a dispatch decision making portion that makes a decision as to whether or not it is necessary to dispatch a service person by referencing the dispatch condition table.

Moreover, the monitoring system for automatic transaction machines in a fourth aspect of the present invention is provided with a monitoring center that monitors the operations of a plurality of automatic transaction machines and acquires cash reserve information from the automatic transaction machines on the amount of cash on hand in the machines, to make a decision as to whether or not it is necessary to dispatch a service person, with the monitoring center comprising a dispatch condition table that indicates the relationship between the total cash reserve in the operating automatic transaction machines at a given branch and the necessity for dispatch of a service person, and a dispatch decision making portion that decides whether or not it is necessary to dispatch a service person by referencing the dispatch condition table.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

PREFERRED EMBODIMENTS OF THE INVENTION

The following is a detailed explanation of preferred embodiments of the monitoring method and the monitoring system for automatic transaction machines based upon the present invention.

Figure 1:
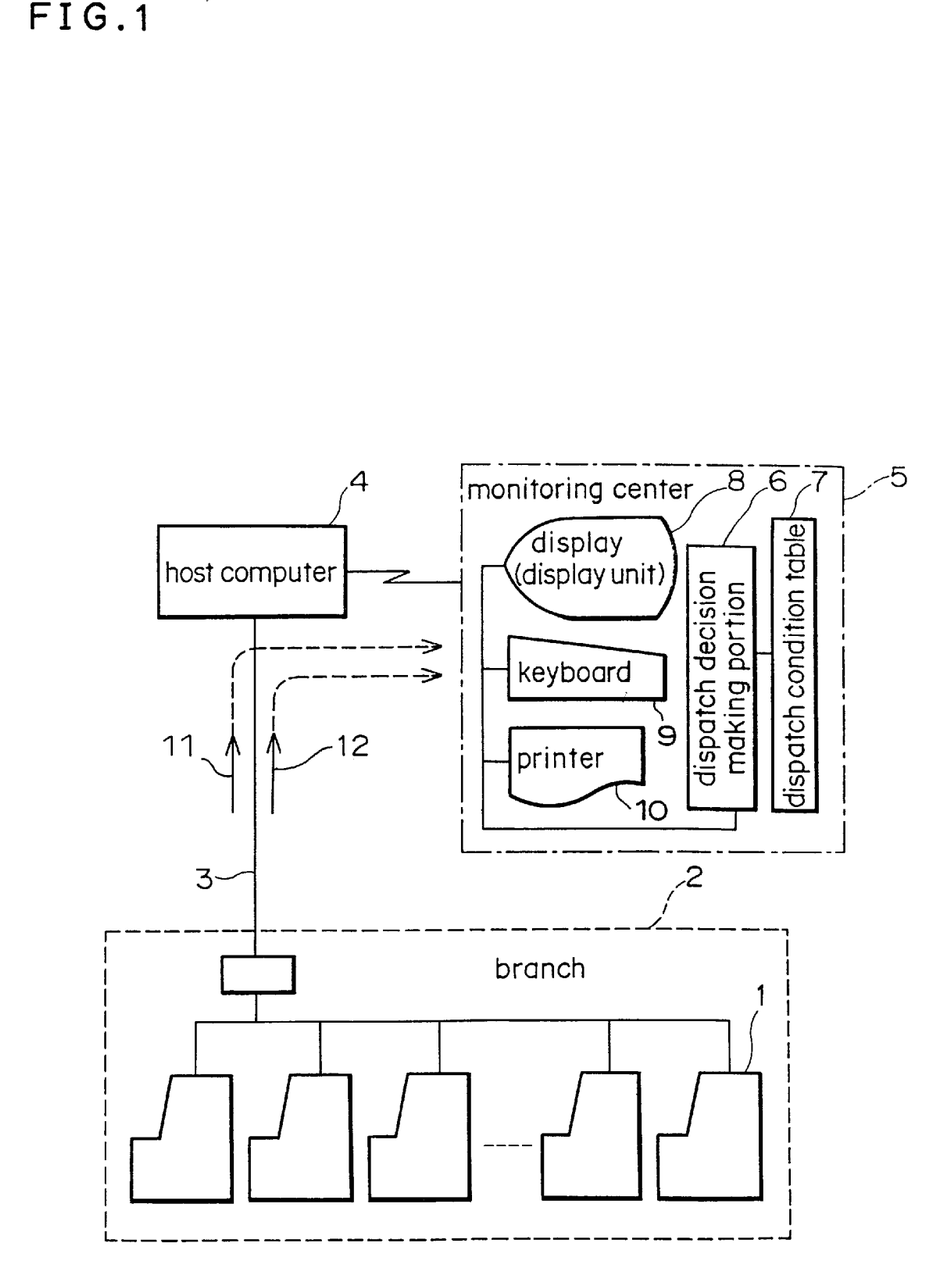
FIG. 1 is a block diagram of the automatic transaction machine monitoring system according to the present invention.

FIG. 1 is a block diagram of a specific example of the automatic transaction machine monitoring system according to the present invention.

As shown in FIG. 1, a plurality of automatic transaction machines 1 in the known art are installed at a branch 2 of a bank or the like. These machines execute transactions such as deposits, withdrawals and transfers in response to requests by a customer. The branch 2 is connected with a host computer 4 via a communication line 3. The host computer 4 controls transactions performed at each automatic transaction machine 1 and manages its data. A monitoring center 5 is connected to the host computer 4. The monitoring center 5 monitors the state of each automatic transaction machine 1 through the host computer 4 and performs management whereby a service person is dispatched or a service person is placed on standby for dispatch in accordance with the failure status and the amount of cash reserve on hand. In this embodiment, the monitoring center 5 collects failure information 11, on the presence/absence of failures at the individual automatic transaction machines and cash reserve information 12 on the amount of cash reserve on hand, from the branch 2.

In order to execute such monitoring, the monitoring center 5 is provided with a dispatch decision making portion 6, a dispatch condition table 7, a display 8, a keyboard 9 and a printer 10. The dispatch decision making portion 6, as explained later, performs processing by referencing the dispatch condition table 7 and making a decision as to whether or not it is necessary to dispatch a service person. The results of this decision making are displayed on the display 8. Then, when the operator views the contents of the display, measures such as issuing a dispatch request and the like are taken. The keyboard 9, which is operated by an operator at the monitoring center, is used for entering various types of instructions, and the printer 10 is employed to print out the monitoring results and other types of data.

The monitoring center 5 described above may be constituted of, for instance, one or a plurality of work stations or the like.

Figure 2:
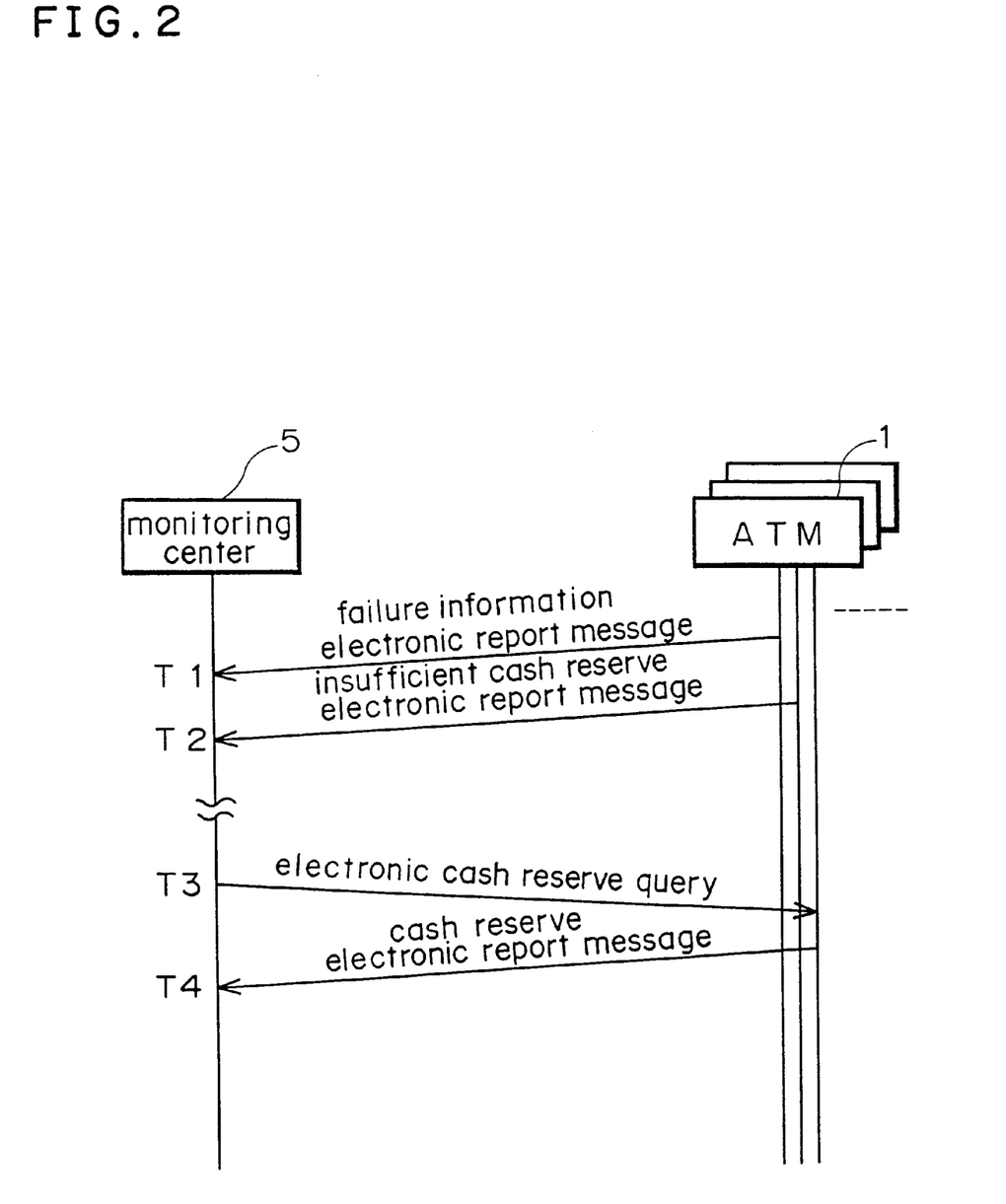
FIG. 2 illustrates the information collecting operation performed at the monitoring center.

FIG. 2 illustrates the information collecting operation performed at the monitoring center.

A failure information electronic report message or an insufficient cash reserve electronic report message is transmitted to the monitoring center 5 from one of the automatic transaction machines 1 being monitored every time a change in its state has occurred, for instance, with the arbitrary timing of T1 or T2. The failure information electronic report message is an electronic message that is issued when the machine has stopped operation due to, for instance, defective transport of bank notes or other various reasons. In addition, this electronic message is issued when the operation has been restarted. The insufficient cash reserve electronic report message is issued to the monitoring center 5 when the cash reserve has fallen to or below a preset threshold value. The electronic messages with these contents are transmitted from each automatic transaction machine 1 to the monitoring center 5 whenever necessary.

If there is no significant change in the status of an automatic transaction machine 1, there may be an extended period of time during which no message is issued. In such a case, the monitoring center 5 transmits an electronic query in regard to the amount of cash reserve with a timing of T3, which may be, for instance, at one hour intervals. When such an electronic query is transmitted, each automatic transaction machine 1 issues a cash reserve electronic report message to the monitoring center 5 with the timing T4 in the figure. The monitoring center 5 collects the most recent failure information and cash reserve information on all the automatic transaction machines 1 over specific intervals in this manner.

Figure 3A:
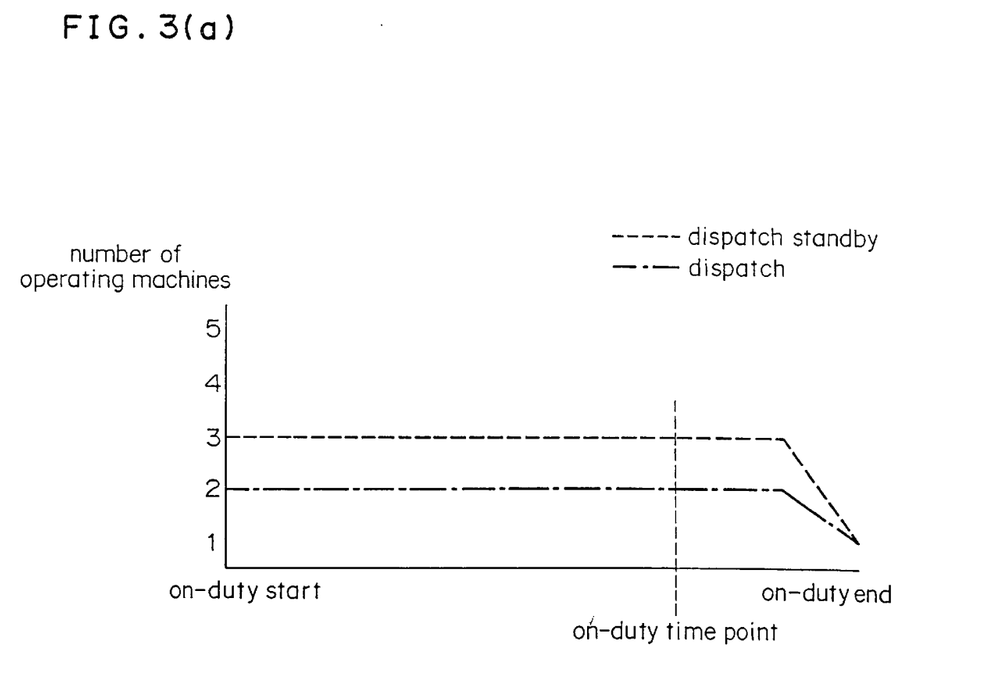
FIG. 3(a) is a graph showing the relationship between the number of operating automatic transaction machines and the time during which these machines are operating.
Figure 3B:
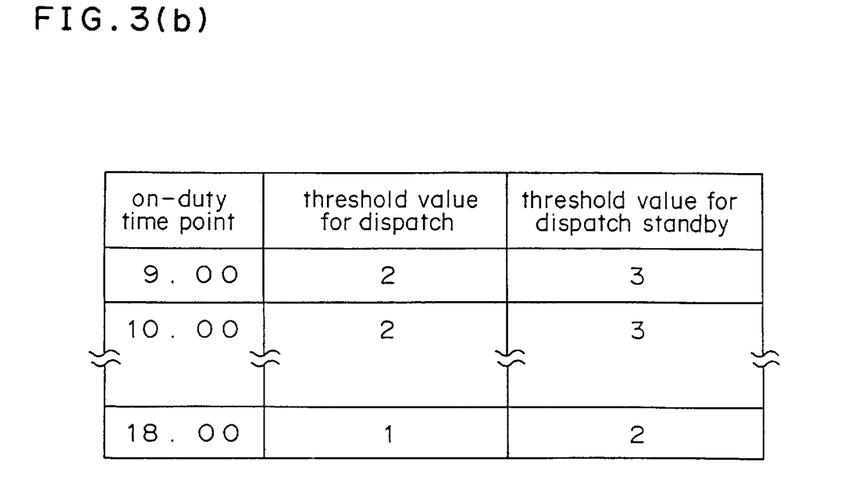
FIG. 3(b) is a dispatch condition table based upon the number of operating machines.

FIGS. 3(a) and 3(b) illustrate the dispatch condition based upon the number of operating machines, which characterizes the present invention.

FIG. 3(a) is a graph in which on-duty time is represented along the horizontal axis and the number of automatic transaction machines that are actually operating is represented along the vertical axis. The broken line in this graph represents the threshold value for the number of operating machines at which a service person is placed on standby, and the one-point chain line represents the threshold value for the number of operating machines at which the service person is required to be dispatched. These relationships are rendered in a table in the dispatch condition table 7 and stored in a storage device at the monitoring center 5 in the format shown in FIG. 3(b). As has been explained, in this embodiment, the dispatch decision making is performed in two stages. However, the present invention is not limited to this example, and it is obvious that it may be performed in one stage or the decision making may be implemented in three stages or more.

For instance, let us assume that there are a total of 5 automatic transaction machines, as shown in FIG. 3(a). In this situation, if one machine shuts down due to some type of failure, business is continued unaffected. However, if two machines shut down and business is being carried out with only three machines, a dispatch standby state is entered since the immediate dispatch of a service person will be required if a failure occurs in a third machine. Then, if a failure occurs in another machine the service person is dispatched. By setting a definite threshold value in advance in this manner, it becomes possible for the system at the monitoring center to perform automatic decision making as to whether or not dispatch is necessary.

There may be cases in which no dispatch is required even with three machines down if the time is nearing the end of the on-duty period, i.e., 30 minutes before the end of the on-duty period, for instance. Thus, as shown in the figure, in this embodiment, when the time is sufficiently close to the end of the on-duty period, these threshold values are lowered.

For instance, the table shown in FIG. 3(b) lists the threshold values used from 9 o'clock in the morning until 18 o'clock. As shown in the figure, after 18 o'clock, the threshold value for dispatch is reduced from 2 to 1 and the threshold value for dispatch standby is reduced from 3 to 2. It is obvious that these threshold values may be changed freely to fit the utilization factors of a given branch.

Next, the operation of this embodiment performed by using the condition table described above, is explained.

Figure 4:
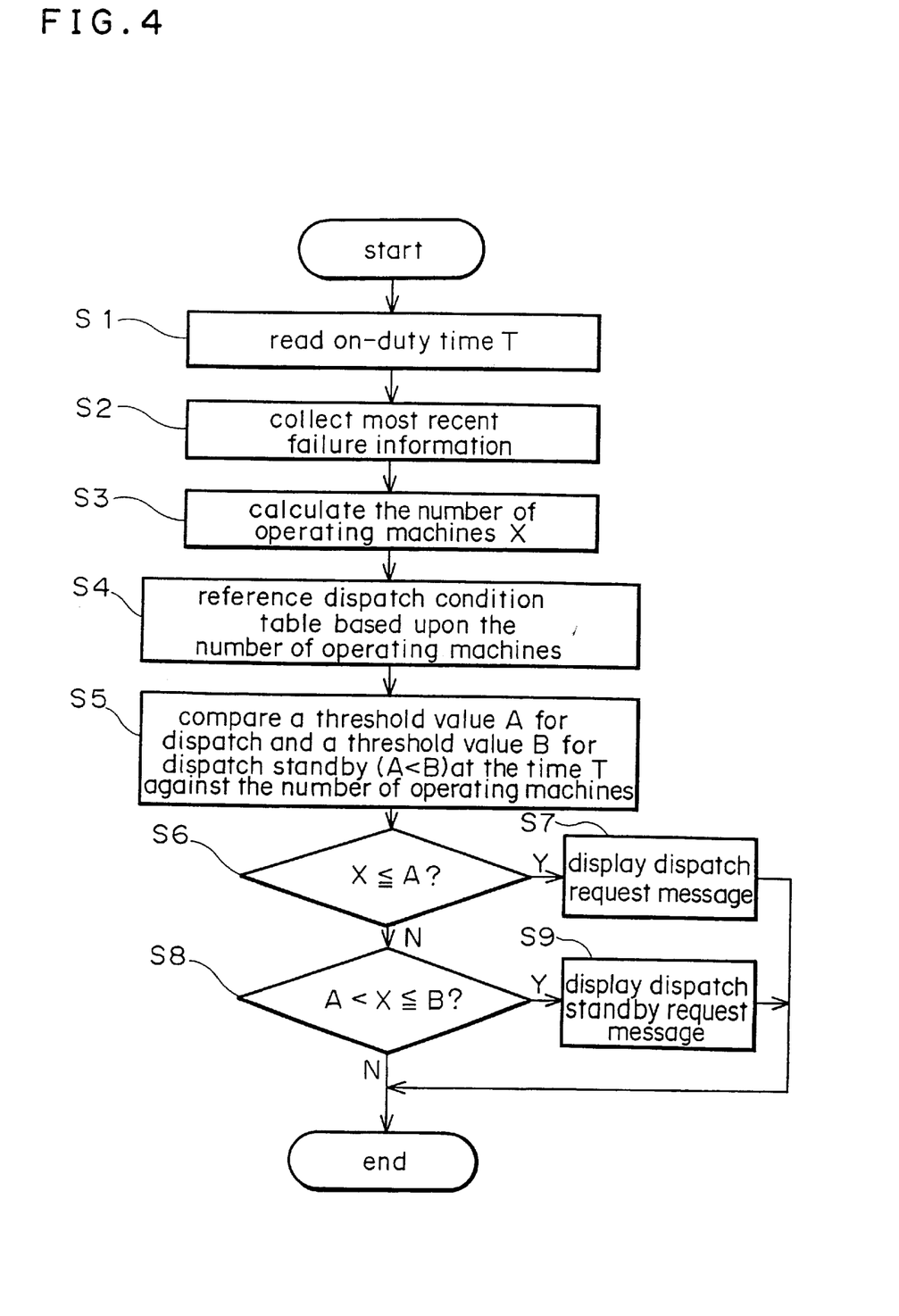
FIG. 4 is a flowchart of the dispatch decision making operation based upon the number of operating machines.

FIG. 4 is a flowchart of the dispatch decision making operation which is performed based upon the number of operating machines.

In the figure, first, in step S1, the monitoring center 5 shown in FIG. 1 reads the on-duty time T. This on-duty time refers to the current time of day. For instance, the time can be read from clock data or the like provided at the terminal of the monitoring center. In step S2, the most recent failure information is collected. In other words, the monitoring center collects all the necessary failure information from the automatic transaction machines from which no information has been issued for the past one hour or thirty minutes. Then, in step S3, the number of operating machines X is calculated. Next, in step S4, the dispatch condition table, which is based upon the number of operating machines, as shown in FIG. 3, is referenced.

In step S5, the number of operating machines X is compared against the threshold value A for dispatch and the threshold value B for dispatch standby at the time point T. In this process, A indicates the decision making criteria represented by the one-point chain line in FIG. 3(a) and B indicates the decision making criteria represented by the broken line in FIG. 3(a). The decision making is performed by reading the numerical values corresponding to the on-duty time point T from the table of FIG. 3(b) and comparing them against the number of operating machines X. If it is decided that the number of operating machines X is at or lower than the threshold value A for dispatch in step S6, the operation proceeds to step S7, in which a message requesting a dispatch is displayed on the display 8 at the monitoring center 5 shown in FIG. 1.

If, on the other hand, it is decided in step S6 that the number of operating machines X is larger than the threshold value A for dispatch standby, then a decision is made in step S8 as to whether or not the number X is at or lower than the threshold value B for dispatch standby. If the number of operating machines X is equal to or smaller than the threshold value for dispatch standby, the operation proceeds to step S9 to display the dispatch standby request message. This message, too, is displayed on the display 8 at the monitoring center 5. Thus, the operator at the monitoring center can request a dispatch standby or request a dispatch based upon an accurate decision made by using the condition table.

Figure 5A:
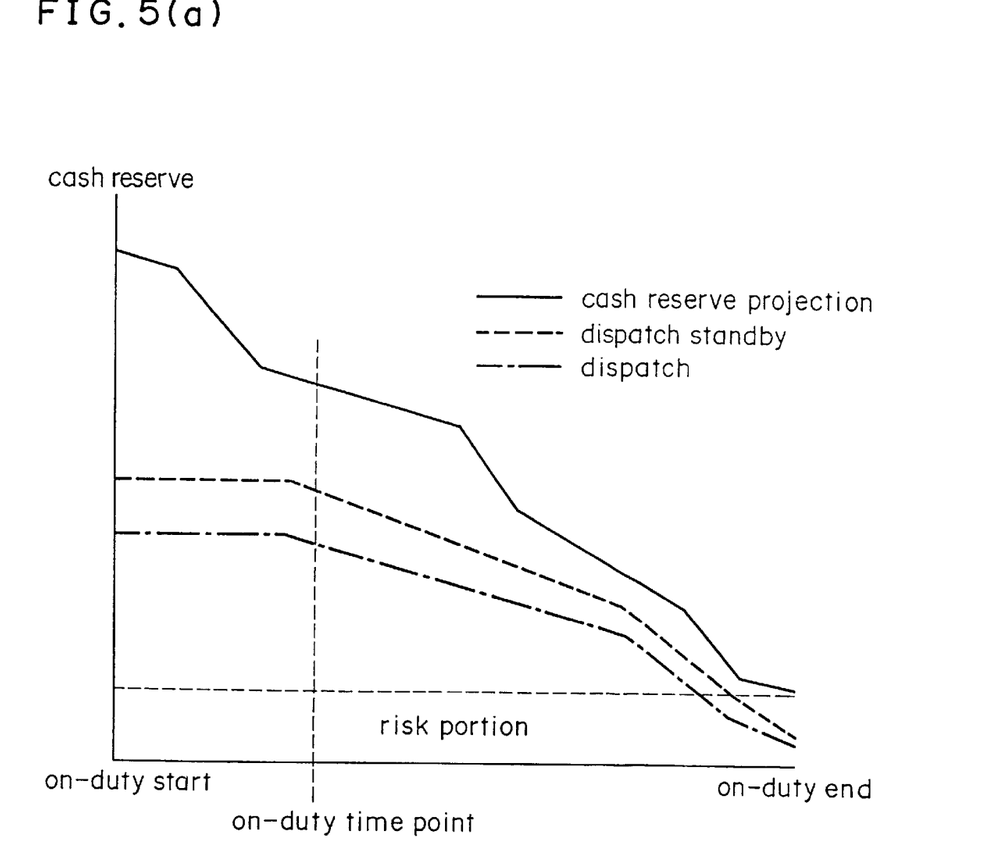
FIG. 5(a) is a graph showing the relationship between the total cash reserve on hand at all the automatic transaction machines and the time during which the cash reserve exists.
Figure 5B:
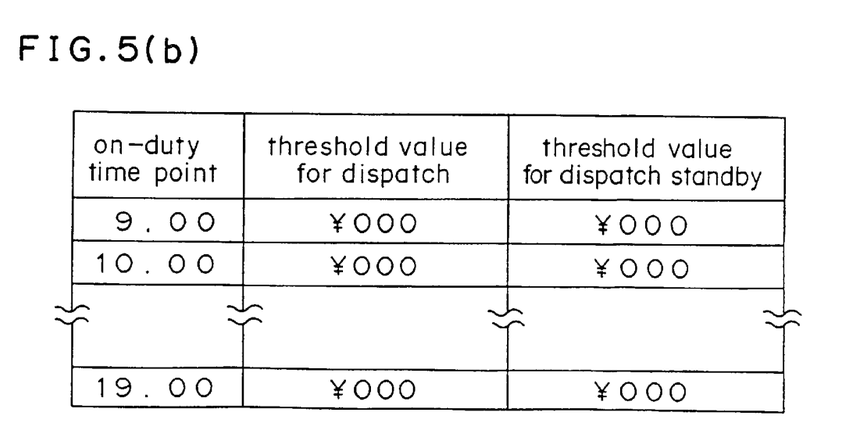
FIG. 5(b) is a dispatch condition table based upon the cash reserve.

FIGS. 5(a) and 5(b) shows an example of the dispatch condition which is based upon cash reserve.

In FIG. 5(a), the horizontal axis represents the on-duty time and the vertical axis represents the total cash reserve of cash on hand at all the operating automatic transaction machines. For instance, it is assumed that on a given day, the cash reserve is expected to become reduced as the time elapses, as indicated by the solid line in the figure. In this situation, if the cash reserve unexpectedly becomes reduced to the level indicated with the broken line, a dispatch standby is required and if the cash reserve becomes reduced to the level indicated with the one-point chain line, a dispatch is required. In either case, the setting is made in such a manner that the level requiring the action becomes gradually lower as the on-duty time advances. The data shown in FIG. 5(b) represents those threshold values rendered in a table. In these data, the on-duty time is made to correspond with the threshold value for dispatch and the threshold value for dispatch standby.

As explained above, with the cash reserve, the criteria for making a decision in regard to a state requiring a dispatch standby and a state requiring a dispatch change greatly in correspondence with the on-duty time. Consequently, unless these changes are ascertained fully, the operator will have to rely upon his experience to make decisions and, therefore, dispatch requests and the like may not be issued accurately.

However, in this embodiment, accurate decision making is achieved with the system referencing the data table shown in FIG. 5(b). It is to be noted that while the decision making criteria for issuing a dispatch request in the example shown in the figure are set in two stages, it is obvious that the decision making criteria may be set in one stage or in three stages or more, as in the case of the previous embodiment.

Figure 6:
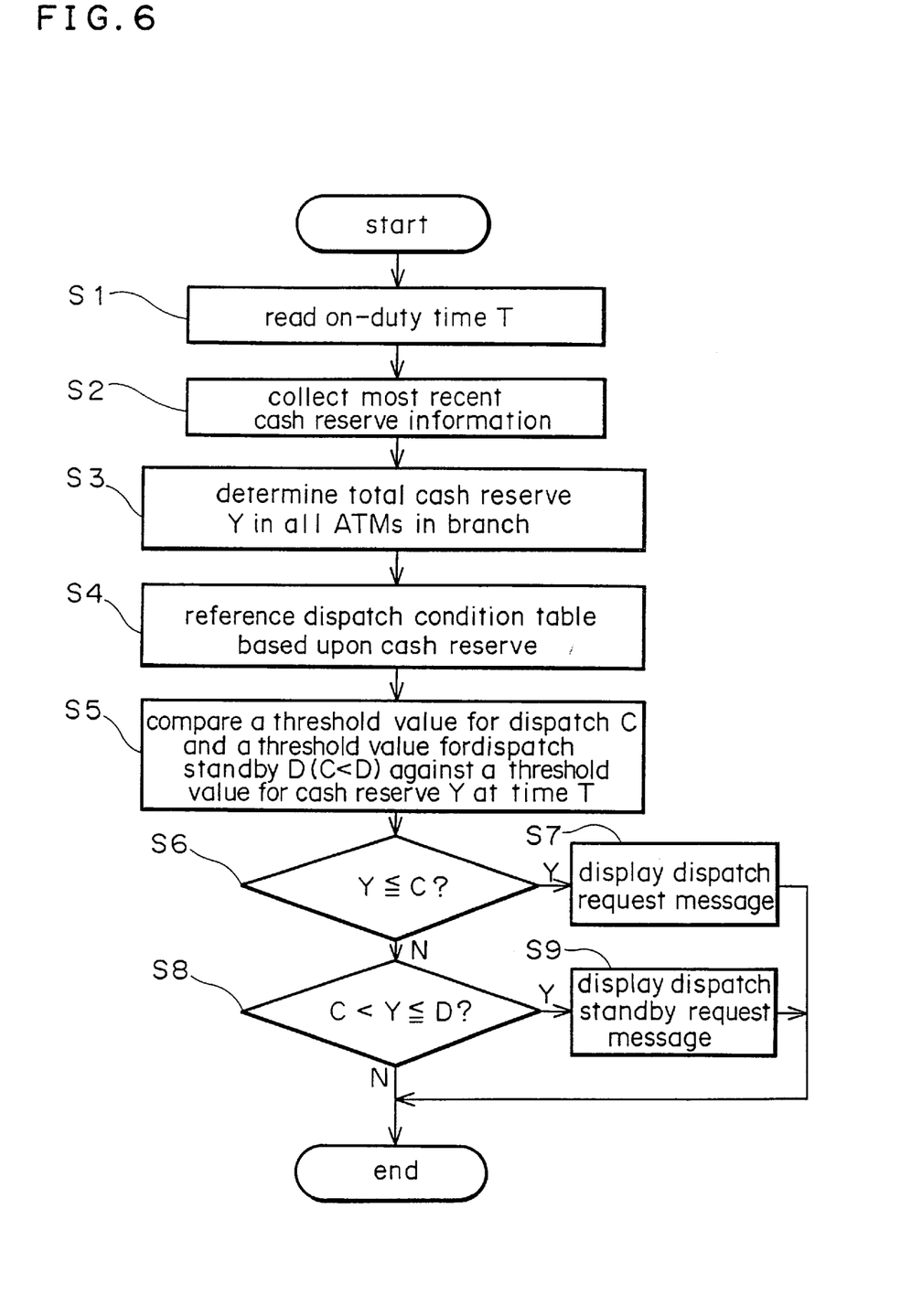
FIG. 6 is a flowchart illustrating the dispatch decision making operation based upon the amount of cash reserve.

FIG. 6 shows a flowchart of the dispatch decision making operation based upon cash reserve.

First, in step S1, the on-duty time, i.e., the current time of day T is read. In step S2, the most recent cash reserve information is collected from each automatic transaction machine. Then, in step S3, the total cash reserve Y in all the operating ATM(Automated Teller Machine)s at the branch is determined. The total cash reserve Y is determined in this manner since, even when the cash reserve in a given ATM is low, if other ATMs have sufficient cash on hand, the total fund can still be efficiently utilized. In addition, the total cash reserve in the currently operating machines is tallied in this manner since, if a large amount of cash is stored in a non-operating machine, adequate utilization may become difficult with the cash reserve in the only remaining automatic transaction machines.

Next, in step S4, the dispatch condition table based upon the cash reserve is referenced. Then, in step S5, the threshold value C for dispatch and the threshold value D for dispatch standby at the time T are compared against the cash reserve Y. First, in step S6, C and Y are compared with each other and if the cash reserve Y is at or lower than the threshold value C for dispatch, the operation proceeds to step S7 to display a dispatch request message. If, on the other hand, the cash reserve Y is larger than the threshold value C for dispatch, the operation proceeds to step S8 to make a decision as to whether or not the cash reserve Y is at or lower than the threshold value D for dispatch standby. If the cash reserve Y is at or less than the threshold value D for dispatch standby, the operation proceeds to step S9 to display a dispatch standby message. In cases other than those described above, a dispatch is not required and, therefore, no display is made.

All the operations performed at the monitoring center 5 described above may be achieved through control performed by a computer program in the computer which functions as the monitoring center. Consequently, the system according to the present invention can be achieved by recording the program on a recording medium such as a floppy disk, a CD ROM or the like and installing it into a regular computer or by downloading it through a network.

When the monitoring method and the monitoring system for automatic transaction machines according to the present invention described above are employed, the most recent status information and the most recent cash reserve information are collected and decision making for requesting a dispatch standby or a dispatch that is necessitated when the number of operating machines becomes reduced or the cash reserve becomes insufficient can be performed accurately using table data, thereby reducing the responsibility of the monitoring operator. In addition, a request for dispatch standby is issued in a timely manner, allowing the service person sufficient time to be prepared prior to the actual dispatch to achieve smooth utilization. Furthermore, even when the cash reserve has become drastically reduced in relation to the projected fund usage, appropriate action can be taken to achieve an improvement in customer service.

While the invention has been particularly shown and described with reference to preferred embodiments thereof, the present invention is not limited to these examples and it will be understood by those skilled in the art that various changes in form and detail may be made therein without departing from the spirit, scope and teaching of the invention.

The entire disclosure of Japanese Patent Application No. 9-076583 filed on Mar. 12, 1997 including the specification, claims, drawings and summary is incorporated herein by reference in its entirety.

What is claimed is:

1. A monitoring system for automatic transaction machines provided with:
    a monitoring center that monitors operations of a plurality of automatic transaction machines and obtains failure information from said automatic transaction machines on the presence/absence of failures to make a decision as to whether or not it is necessary to dispatch a service person; wherein:
    said monitoring center is provided with a dispatch condition table indicating a relationship between the number of operating machines and the necessity for dispatch and a dispatch decision making portion that makes a decision as to whether or not it is necessary to dispatch a service person by referencing said dispatch condition table.

2. A monitoring system for automatic transaction machines according to claim 1, wherein: said dispatch condition table comprises criteria indicating the necessity for dispatch based upon a relationship between the on-duty time and the number of operating machines.

3. A monitoring method for automatic transaction machines according to claim 2, wherein: said criteria are divided in a plurality of stages and contents of said display vary for individual stages.

4. A monitoring method for automatic transaction machines according to claim 2, wherein: said criteria change in correspondence to the time period and time zone.

5. A monitoring system for automatic transaction machines provided with:
    a monitoring center that monitors operations of a plurality of automatic transaction machines and obtains cash reserve information from said automatic transaction machines on cash reserves therein to make a decision as to whether or not it is necessary to dispatch a service person; wherein:
    said monitoring center is provided with a dispatch condition table indicating a relationship between total cash reserves in operating machines at a given branch and the necessity for dispatch and a dispatch decision making portion that makes a decision as to whether or not it is necessary to dispatch a service person by referencing said dispatch condition table.

6. A monitoring system for automatic transaction machines according to claim 5, wherein: said dispatch condition table comprises criteria indicating the necessity for dispatch based upon a relationship between the on-duty time and the total cash reserves in said automatic transaction machines in a given branch.

7. A monitoring method for automatic transaction machines according to claim 6, wherein: said criteria are divided in a plurality of stages and a contents of said display vary for individual stages.

8. A monitoring method for automatic transaction machines according to claim 6, wherein: said criteria change in correspondence to the time period and time zone.

9. A monitoring method for automatic transaction machines comprising:
    a step in which operations of a plurality of automatic transaction machines are monitored to acquire failure information from said automatic transaction machines on the presence/absence of failures therein; and
    a step in which a decision is made as to whether or not it is necessary to dispatch a service person based upon criteria that are prepared in advance to indicate a relationship between the number of operating machines and the necessity for dispatch with the results thereof being displayed, said criteria further indicating the necessity for dispatch based upon a relationship between the on-duty time and the number of operating machines.

10. A monitoring method for automatic transaction machines comprising:
    a step in which operations of a plurality of automatic transaction machines are monitored to acquire failure information from said automatic transaction machines on the presence/absence of failures therein; and
    a step in which a decision is made as to whether or not it is necessary to dispatch a service person based upon criteria that are prepared in advance to indicate a relationship between the number of operating machines and the necessity for dispatch with the results thereof being displayed, said criteria being divided into a plurality of stages, the contents of a display varying for each stage.

11. A monitoring method for automatic transaction machines comprising:
    a step in which operations of a plurality of automatic transaction machines are monitored to acquire failure information from said automatic transaction machines on the presence/absence of failures therein; and
    a step in which a decision is made as to whether or not it is necessary to dispatch a service person based upon criteria that are prepared in advance to indicate a relationship between the number of operating machines and the necessity for dispatch with the results thereof being displayed, said criteria being divided in correspondence to a given time period and a given time zone.

12. A monitoring method for automatic transaction machines comprising:
    a step in which operations of a plurality of automatic transaction machines are monitored to acquire cash reserve information from said automatic transaction machines on cash reserves therein; and
    a step in which a decision is made as to whether or not it is necessary to dispatch a service person based upon criteria that are prepared in advance to indicate a relationship between total cash reserves in operating automatic transaction machines at a given branch and the necessity for dispatch with the results thereof being displayed, said criteria further indicating the necessity for dispatch based upon a relationship between the on-duty time and the number of operating machines.

13. A monitoring method for automatic transaction machines comprising:
    a step in which operations of a plurality of automatic transaction machines are monitored to acquire cash reserve information from said automatic transaction machines on cash reserves therein; and
    a step in which a decision is made as to whether or not it is necessary to dispatch a service person based upon criteria that are prepared in advance to indicate a relationship between total cash reserves in operating automatic transaction machines at a given branch and the necessity for dispatch with the results thereof being displayed, said criteria being divided into a plurality of stages, the contents of a display varying for each stage.

14. A monitoring method for automatic transaction machines comprising:

a step in which operations of a plurality of automatic transaction machines are monitored to acquire cash reserve information from said automatic transaction machines on cash reserves therein; and a step in which a decision is made as to whether or not it is necessary to dispatch a service person based upon criteria that are prepared in advance to indicate a relationship between total cash reserves in operating automatic transaction machines at a given branch and the necessity for dispatch with the results thereof being displayed, said criteria being divided in correspondence to a given time period and a given time zone.

* * * * *